C. L. HOWARD.
SPEED CHANGING TRANSMISSION GEARING.
APPLICATION FILED APR. 22, 1913.
1,157,001.
Patented Oct. 19, 1915.
2 SHEETS—SHEET 1.
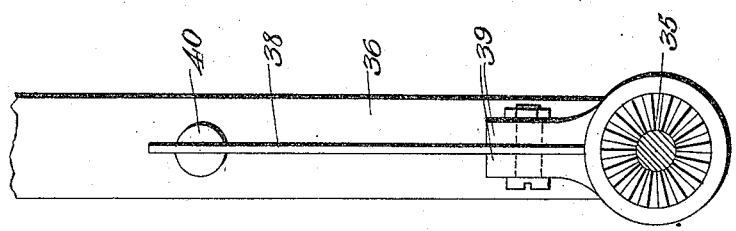
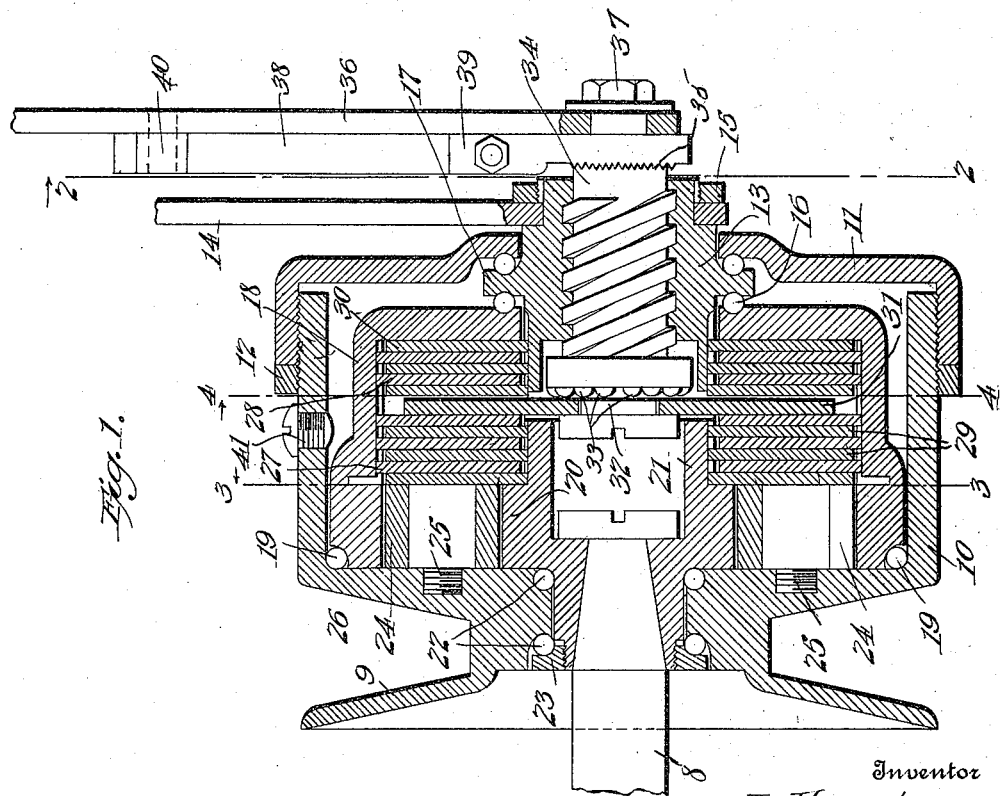

C. L. HOWARD.
SPEED CHANGING TRANSMISSION GEARING.
APPLICATION FILED APR. 22, 1913.
1,157,001.
Patented Oct. 19, 1915.
2 SHEETS—SHEET 2.
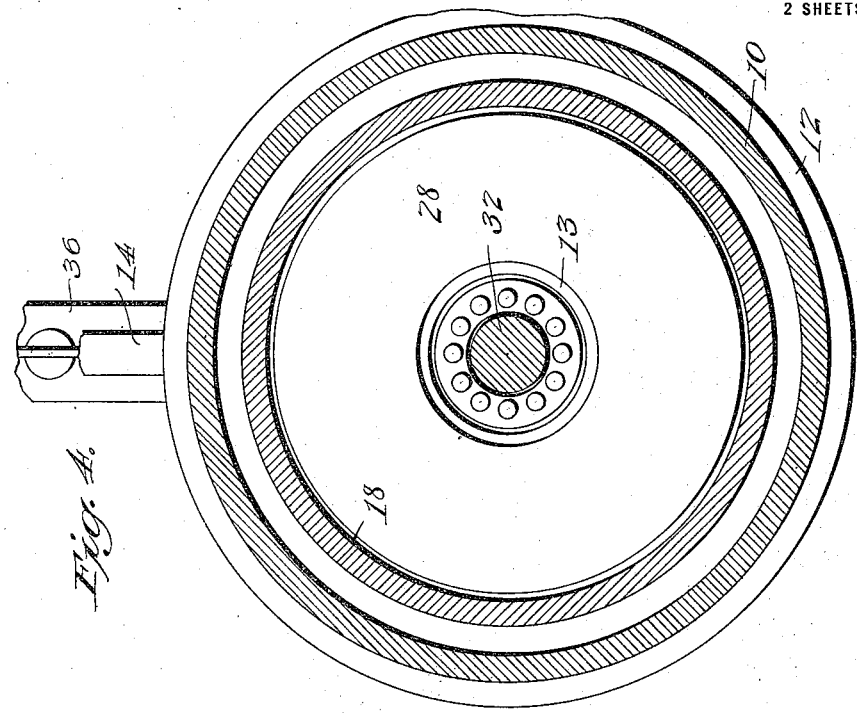
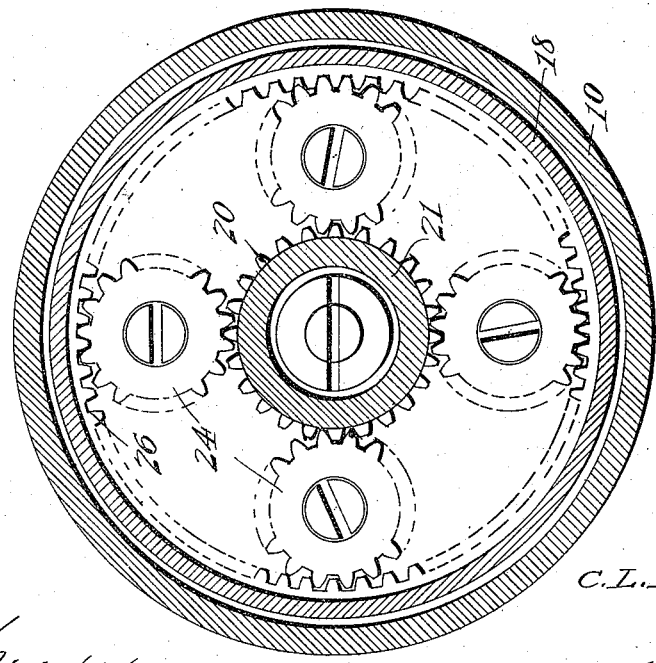
Witnesses
Inventor
C. L. Howard
By
Geo. S. Vashon
Attorney

UNITED STATES PATENT OFFICE.

CHARLES L. HOWARD, OF CAPAY, CALIFORNIA.

SPEED-CHANGING TRANSMISSION-GEARING.

1,157,001.  Specification of Letters Patent.  Patented Oct. 19, 1915.

Application filed April 22, 1913. Serial No. 762,763.

*To all whom it may concern:*

Be it known that I, CHARLES L. HOWARD, a citizen of the United States, residing at Capay, in the county of Yolo and State of California, have invented new and useful Improvements in Speed-Changing Transmission-Gearing, of which the following is a specification.

This invention relates to speed changing transmission gearing in general and particularly to gearing known as the planetary type.

The general object of the invention is to provide improved gearing of the type specified of a nature to be applied to general purposes for which speed changing gearing is used but particularly for use in motorcycles.

A special object of the invention is to provide a compact construction of simple parts in motorcycle speed changing transmission gearing operable to change from a state of rest to either a high or low speed by the manipulation of a single lever.

With these objects in view the invention consists in the improved construction, arrangement and combination of parts of a transmission gearing of the type specified, which will be fully described hereinafter and afterward specifically claimed.

In order that its construction and operation may be readily comprehended, I have illustrated in the accompanying drawings an approved embodiment of my invention in which drawings—

Figure 1 represents a sectional view on a central longitudinal plane cutting through the complete mechanism, parts being shown in elevation and parts broken away. Fig. 2 represents a sectional view on a transverse plane indicated by the broken line 2—2 in Fig. 1, looking to the right, as indicated by the arrows. Fig. 3 represents a like sectional view on the plane indicated by the broken line 3—3 in Fig. 1, looking to the left, as indicated by the arrows. Fig. 4 represents a like sectional view on the plane indicated by the broken line 4—4 of Fig. 1, looking to the right, as indicated by the arrows.

Like reference characters mark the same parts in all of the figures of the drawings.

Referring specifically to the drawings, the driving element is a central shaft 8, while the driven element is in the form of a pulley 9 (or a chain sprocket gear) which forms also a part of the casing 10 for the parts of the changeable speed transmission mechanism. The second part or cover 11 of the casing 10 is removably secured to the first part and locked thereon by the ring 12.

A sleeve 13 is disposed in absolute alinement with the drive shaft 8 and carries an arm 14 rigidly secured thereto under a nut 15. The arm 14 is adapted to be anchored to a suitable support or frame (not shown), so as to lock the sleeve 13 against rotation. Bearing balls 16 are disposed between a flange 17 on the sleeve 13 and the cover 11, which latter is apertured to receive said sleeve. A shell 18 is rotatably mounted within the casing 10 and is supported by bearing balls 16, disposed between the inner corner and the flange 17, and also between opposite outer corner of said sleeve and the outer corner of the casing 10 carrying the pulley 9.

The end of the drive shaft 8 is tapered and keyed to the central pinion 20 having a laterally projecting flange 21. Bearing balls 22 are disposed between the body of the pulley 9 and the hub of the central pinion 20, and are held in operative position by a cone 23. Intermediate or planetary pinions 24, meshing with the pinion 20, are mounted on the stub ends of threaded shanks 25 secured in the pulley 9. The planetary pinions 24 also mesh with the teeth 26 on the interior of the large open end of the shell 18.

The clutch mechanism comprises a double set of friction disks 27 and 28, mounted to rotate with the shell 18, and complementary sets of disks 29 and 30, mounted to rotate with the central pinion 20 and sleeve 13, respectively. An abutment disk 31 is loosely mounted between the sets 27 and 29, and 28 and 30 of friction disks and rotatably mounted upon the shank of a bolt 32 and between the head of the latter and a ring of bearing balls 33.

The bolt 32 is threaded in the end of a screw shaft 34, adapted for rotary and longitudinal movement through the threaded bore of the sleeve 13. The outer end of the screw shaft 34 is reduced and the shoulder thereon radially corrugated to coöperate with the corrugations on the inner face of the ring 35 carried by the operating lever 36, both of the latter parts being prevented from disengagement with the reduced end by a nut 37. The lever 36 is loosely mounted upon the reduced end of the screw shaft 34, while the ring 35 is yieldably attached to the operating lever 36 by the leaf spring 38, anchored at one end between the jaws 39 of said ring and at the opposite end in a split lug 40, carried by said lever. The ring 35 yieldably operates the screw shaft 34 from the operating lever 36 and prevents injury to the mechanism by abrupt or violent shifting of the operating lever.

A removable screw plug 41 is positioned through the casing 10 at a convenient point to permit the interior mechanism to be oiled at such times as desired.

The operation of the device is as follows: When the parts are in the position shown in Fig. 1, the abutment disk 31 is in its neutral position, and rotation of the drive shaft 8 is transmitted to the rotatable shell 18 through the planetary gear pinions 24, while the pulley 9, casing 10 and cover 11 remain stationary. In order to lock the drive shaft 8 with the pulley 9, to rotate the latter at high speed, the operating lever 36 is shifted in the proper direction to move the screw shaft 34 together with the abutment disk 31 inwardly, and thus lock the shell 18 with central gear 20 by means of the frictionally locked disks 27 and 29. In order to rotate the pulley 9 at less speed than the drive shaft 8, the operating lever 36 is shifted in the opposite direction to move the abutment disk 31 against the set of friction disks 28 and 30 and thus lock the shell 18 stationary with respect to the sleeve 13. The pulley 9 is consequently rotated with the central gear pinion 20 of the drive shaft 8 by the planetary gear pinions 24, but at less speed.

What I claim is:—

1. The combination with a driving element, of a driven element carrying a casing, a central pinion keyed to the end of said driving element, planetary pinions carried by said driven element, a shell rotatable in said casing and having teeth meshing with said planetary pinions, means for locking said shell with said central pinion, and for locking said shell stationary.

2. The combination with a casing having a driven element attached thereto, of a driving element, a central pinion fixed to the end of said driving element, a shell rotatable in said casing and having interior teeth formed in one end thereof, planetary pinions carried by said driven element and meshing with said central pinion and the teeth on said shell, a sleeve rotatable in the cover of said casing, a stationary support and clutching means operated thereby for locking said shell with either said driving element or said stationary support.

3. In combination a shaft, a pulley having a drum surrounding said shaft, a sleeve fixed in position in alinement with said shaft, a shell surrounded by said drum and mounted loosely on said sleeve, means actuated by the shaft to rotate the shell, a member arranged to reciprocate between the inner end of the shaft and the sleeve, and means coöperating with said first named means and engaged by said reciprocating member in one direction to cause said pulley to rotate at high speed and in the opposite direction to cause the rotation of the pulley at low speed.

In testimony whereof, I affix my signature in presence of two witnesses.

CHARLES L. HOWARD.

Witnesses:
A. A. COLLINS.
W. J. BUTLER.

Copies of this patent may be obtained for five cents each, by addressing the "Commissioner of Patents, Washington, D. C."